United States Patent [19]
Ikemori

[11] 4,111,558
[45] Sep. 5, 1978

[54] RETROFOCUS TYPE WIDE ANGLE OBJECTIVE LENS

[75] Inventor: Keiji Ikemori, Yokohama, Japan

[73] Assignee: Canon Kabushiki Kaisha, Tokyo, Japan

[21] Appl. No.: 715,491

[22] Filed: Aug. 18, 1976

[30] Foreign Application Priority Data

Aug. 22, 1975 [JP] Japan ................ 50-101863

[51] Int. Cl.² ................ G02B 13/04; G02B 11/34
[52] U.S. Cl. ................ 350/189; 350/214
[58] Field of Search ............... 350/214–216, 350/189

[56] References Cited

U.S. PATENT DOCUMENTS

| | | | |
|---|---|---|---|
| Re. 27,799 | 10/1973 | Shimizu | 350/214 |
| 3,958,864 | 5/1976 | Glatzel | 350/214 |
| 3,999,840 | 12/1976 | Momiyama | 350/189 |

FOREIGN PATENT DOCUMENTS

1,118,266 6/1968 United Kingdom .................. 350/214

*Primary Examiner*—Conrad J. Clark
*Attorney, Agent, or Firm*—Toren, McGeady and Stanger

[57] ABSTRACT

A retrofocus type wide angle objective lens comprising from front to rear a diverging first lens component having a non-spherical surface formed therein, a converging second lens component, a diaphragm, and a converging third lens component, whereby the second component includes a positive front lens followed by a negative lens, said positive and said negative lenses defining therebetween a first air lens of which the focal length is negative in sign, and the third component includes a negative front lens followed by a positive lens, said negative and said positive lenses defining therebetween a second air lens of which the focal length is also negative. The provision of these first and second air lenses facilitates achievement of good correction of aberrations particularly astigmatism which would be otherwise under-corrected by the introduction of the non-spherical surface into the first component.

17 Claims, 4 Drawing Figures

RETROFOCUS TYPE WIDE ANGLE OBJECTIVE LENS

BACKGROUND OF THE INVENTION

This invention relates to retrofocus wide angle photographic objectives, and more particularly to such objectives that are corrected primarily for distortion by employing a non-spherical lens element with other lens elements which compensate other aberrations than distortion and that this compensation operates particularly effectively for astigmatism.

Various types of retrofocus wide angle lens objectives have been developed and are commonly characterized by the capability of providing a sufficiently long back focus length, but conversely, because of the asymmetrical form of the lens system itself, characterized by a lack of a suitable correction for distortion and either of astigmatism and coma. Particularly simultaneous good correction for both of distortion and astigmatism has been considered extremely difficult to achieve. To overcome this defect in aberrational problems, the necessary number of lens elements is unavoidably increased.

As a method of facilitating aberrational correction without causing a large increase in the complexity of the lens system, it is known to introduce a non-spherical surface to the lens system for distortional correction, provided that the position of the non-spherical surface is reasonably controlled as the introduction of the non-spherical surface affects other aberrations to a very large extent. For better distortional correction, it is preferred to locate the non-spherical surface at a point where off-axis principal light rays of the maximum image angle are incident thereon as large at a height from the optical axis as possible. This is based on the following fact. Letting $\nu$ denote the lens surface number, $h\nu$ the height from the optical axis of a point of incidence of an axial light ray on the corresponding lens surface, and $\bar{h}\nu$ the height from the optical axis of a point of incidence of a diaphragm-centered off-axis principal light ray on the corresponding lens surface, we have the degrees of contribution of a non-spherical surface formed in an optionally selected one to various aberrations in terms of three-order aberration coefficients, namely, spherical aberration I = $\Sigma I\nu$, coma II = $\Sigma II\nu$, astigmatism III = $\Sigma III\nu$, and distortion V = $\Sigma V\nu$, as being proportional to $h\nu^4$ for I$\nu$, $h\nu^3\bar{h}\nu$ for II$\nu$, $h\nu^2\bar{h}\nu^2$ for III$\nu$, and $h\nu\bar{h}\nu^3$ for V$\nu$. These relationships suggest that when a non-spherical surface is employed in correcting for distortion while minimizing its influence on other aberrations, a surface having a larger $\bar{h}\nu$ and simultaneously having a smaller $h\nu$ must be selected for non-spherical configuration.

In the case of a retrofocus wide angle lens system comprising from front to rear a diverging first component, a converging second component, a diaphragm, and a converging third component, it is usual that the surface having the largest $\bar{h}\nu$ and small $h\nu$ is located in the first component.

Even in fifth order and higher order region, it is true that the non-spherical surface operates for distortional correction effectively at a location where $\bar{h}\nu$ is larger. For facilitating correction of distortion in the aforesaid type lens system, it is preferred that the first lens component is provided with at least one non-spherical surface.

On the other hand, for the primary purpose of paralleling the practices used in manufacturing the lens elements under an economical production run, the surface having the largest $\bar{h}\nu$ is not always selected for non-spherical configuration. But, even in this case, the location of the non-spherical surface is limited within the first lens component. With the first lens component with the rearmost surface, for example, being configured to non-spherical, it is possible to achieve good correction for distortion provided either that the number of concave lens elements in the first component is increased with extreme bending as convex toward the front, or that the number of convex lens elements is increased to effect under-correction of distortion to some extent.

The rectangular co-ordinates X and H for expression of the non-spherical surface are given below $$X = R[1 - (1 - \frac{H^2}{R^2})^{\frac{1}{2}}] + AH^2 + BH^4 + CH^6 + DH^8 + EH^{10}$$

wherein $X$ is the co-ordinate of which the axis coincides with the optical axis of the system and which is given the positive sign when it falls to the direction of incident light rays under the assumption that the non-spherical surface intersects the optical axis at its vertex as coincident with the original point; $H$ is the co-ordinate perpenducular to the optical axis; $R$ is the radius of curvature of the non-spherical surface in the paraxial region; and $A$ to $E$ are non-spherical coefficients. Of these non-spherical coefficients, $B$ shall be given the positive sign when the non-spherical surface is convex to the front and given the negative sign when it is concave to the front.

It will be seen from the foregoing that the introduction of such a non-spherical surface to the lens system for the primary purpose of correcting distortion is entirely unfree from also influencing at the same time in an undesirable manner the correction for other aberrations since astigmatism is most strongly deteriorated. This problem becomes serious when the lens system is of the type referred to and to which the present invention relates, as the distortion is under-corrected by the introduction of the non-spherical surface to extremely large extent but within the acceptable range so that the resulting astigmatism is extremely undercorrected. For this reason, a new method must be developed to compensate for this extremely under-corrected astigmatism without causing deterioration of the other aberrations.

SUMMARY OF THE INVENTION

With the foregoing in mind, the present invention is to provide a retrofocus wided angle lens objective of the type described which is highly corrected for distortion and for astigmatism and which also is corrected for spherical aberration and for coma. This objective of the invention includes from front to rear in the direction in which light enters from the object side, a diverging first lens component with a non-spherical surface incorporated therein, a converging second lens component, and a converging third lens component, a diaphragm being located between the second and third components. The second component consists of a front positive lens group and a rear negative lens group with an air space between the rearmost lens surface of said front group and the frontmost lens surface of said rear group defining a first air lens having negative refractive power. The third component consists of a front negative lens group and a rear positive lens group with an air space between the rearmost lens surface of said front group and the frontmost lens surface of said rear group defining a second air lens having negative refractive power.

In the preferred embodiments of the invention described in detail hereinafter, the rear negative lens group of the aforesaid second component includes at least one negative meniscus lens convex to the image. The diaphragm is located near to a point where the principal light ray of an off-axis light bundle intersects the optical aixs and within an air space between two successive lenses of an axial distance large enough to accommodate the diaphragm mechanism.

The aforesaid first air lens and second air lens serves to provide overcorrection for both of astigmatism and distortion, and the overcorrection action on astigmatism is larger than on distortion. For this reason, it is made possible by the action of such two diverging air lenses to compensate for the extreme astigmatic undercorrection resulted from the introduction of a non-spherical surface into the diverging first lens component. This compensation for astigmatism operates with the first air lens effectively mainly in the outer regions of the viewing field from intermediate image angles to the maximum, and with the second air lens effectively mainly in the central region from the paraxial to intermediate angles. If this compensation is otherwise achieved by the suitable design of those of the lens elements which are located on the image side of the diaphragm, that is, by employing only the second air lens in the converging third lens component, the diverging action of the second air lens must be extremely increased. Such increase in turn causes production of the higher order aberrations to a very large extent, thereby it being made difficult to provide for the objective an increased relative aperture and to improve the image quality at the fully open aperture.

The placing of the first air lens in the second lens component must be controlled to such a position as somewhat close to the diaphragm, or otherwise a too large axial separation between the first air lens and the diaphragm would cause extreme distortional under-correction. Further, when the first air lens is located in the region of the diaphragm, neither astigmatism nor distortion can be produced.

It will be appreciated that the present invention has provided a retrofocus wide angle lens objective having two diverging air lenses arranged on the respective opposite sides of the diaphragm, in other words, spaced apart from each other by a substantial axial distance including a point at which the off-axis principal light ray intersects the optical axis of the objective to permit distribution of aberrational correction action therebetween. With this arrangement, it is possible to achieve good compensation for astigmatism without resorting to undue increase in the diverging action of the individual air lenses. Another advantage deriving from no possibility of producing the higher order aberrations to a very large extent is to provide a design flexibility allowing an increased relative aperture and an improved image quality.

DETAILED DESCRIPTION OF THE PREFERRED EMBODIMENTS

Figure 1:
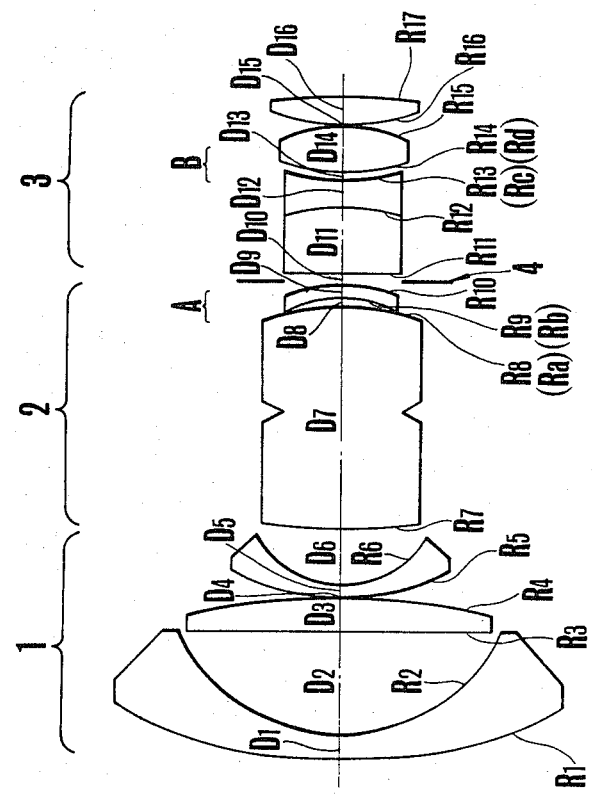
FIG. 1 is a block diagram of one embodiment of a retrofocus wide angle lens objective according to the present invention.

In FIG. 1 there is shown one embodiment of a retrofocus wide angle lens objective according to the present invention which comprises, from front to rear in the direction in which light enters from the object side, a first lens component 1 of negative power, a second lens component 2 of positive power and a third lens component 3 of positive power. A diaphragm which is indicated at 4 is situated between the second and third components 2 and 3. This objective has a first refracting surface $R_1$ which is non-spherical. Component 1 consists of a negative meniscus lens with radii $R_1^*$, $R_2$ (counting from the front) and thickness $D_1$ convex to the front, a double convex lens with radii $R_3$, $R_4$ and thickness $D_3$, and a negative meniscus lens with radii $R_5$, $R_6$ and thickness $D_6$, $D_5$ convex to the front. Component 2 consists of a double convex lens with radii $R_7$, $R_8$ and thickness $D_7$ followed, after an air space $D_8$, by a negative meniscus lens with radii $R_9$, $R_{10}$ and thickness $D_9$ convex to the rear. Component 3 consists of a cemented double concave doublet lens with radii $R_{11}$, $R_{12}$, $R_{13}$ and thicknesses $D_{11}$, $D_{12}$ followed, after an air space $D_{13}$, by a double convex lens with radii $R_{14}$, $R_{15}$ and thickness $D_{14}$ which in turn is followed by a double convex lens with radii $R_{16}$, $R_{17}$ and thickness $D_{16}$. Air space $D_8$ defined between double convex lens ($R_7$, $R_8$) and negative meniscus lens ($R_9$, $R_{10}$) in component 2 functions as a first air lens A. Another air space $D_{13}$ defined in component 3 between double concave lens ($R_{11}$, $R_{13}$) and double convex lens ($R_{14}$, $R_{15}$) functions as a second air lens B. Both of these air lenses A ($R_8$, $R_9$) and B ($R_{13}$, $R_{14}$) act in a diverging manner, and can be used for astigmatic compensation.

Figure 3:
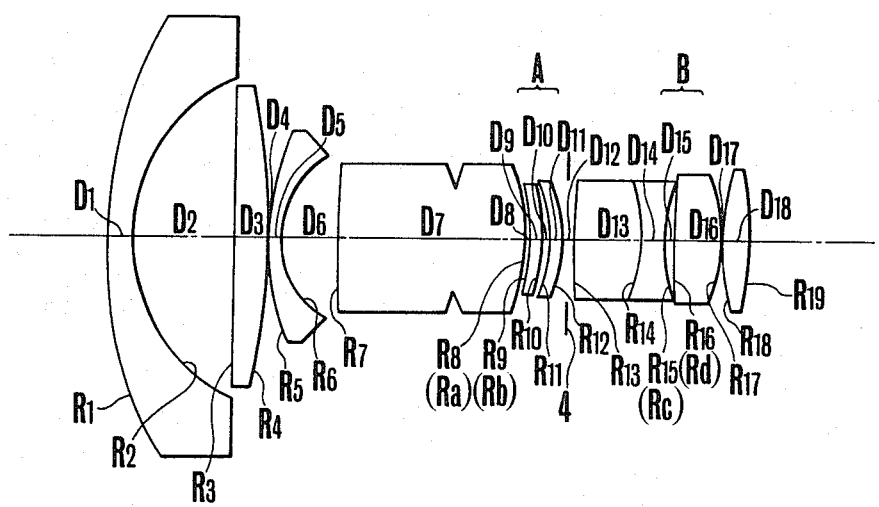
FIG. 3 is a block diagram of another embodiment of a retrofocus wide angle lens objective according to the present invention.

In FIG. 3 another embodiment of a retrofocus wide angle lens objective according to the invention is shown, which comprises three lens components 1, 2 and 3. First component 1 counting from front is divergent and has a similar configuration to that of first component of FIG. 1. Second component 2 is convergent and consists of a double convex lens with radii $R_7$, $R_8$ and thickness $D_7$ followed, after an air space $D_8$, by a negative meniscus lens with radii $R_9$, $R_{10}$ and thickness $D_9$ which in turn is followed, after an air space $D_{10}$, by a negative meniscus lens with radii $R_{11}$, $R_{12}$ and thickness $D_{11}$, convex to the rear. Third component 3 is convergent and consists of a negative meniscus doublet lens convex to the front and consisting of a double convex lens with radii $R_{13}$, $R_{14}$ and thickness $D_{13}$ and a double concave lens with radii $R_{14}$, $R_{15}$ and thickness $D_{14}$ cemented together at their adjoining surfaces $R_{14}$ followed, after an air space $D_{15}$, by a double convex lens with radii $R_{16}$, $R_{17}$ and thickness $D_{16}$ which in turn is followed, after an air space $D_{17}$ by a double convex lens with radii $R_{18}$, $R_{19}$ and thickness $D_{18}$. A diaphragm of the objective is located in an air space $D_{12}$ between second and third components 2 and 3, that is, between surface $R_{12}$ and $R_{13}$. The one of two air spaces $D_8$ and $D_{10}$ in second component 2 which is defined between double convex lens ($R_7$, $R_8$) and negative meniscus lens ($R_9$, $R_{10}$) functions as a diverging first air lens A with radii $R_8$, $R_9$, while the additional air space $D_{10}$ defined between negative meniscus lens ($R_9$, $R_{10}$) and negative meniscus lens ($R_{11}$, $R_{12}$) functions as an air lens ($R_{10}$, $R_{11}$) for assisting in the diverging action. The air space $D_{15}$ in third component 3 which is defined between negative meniscus lens ($R_{13}$, $R_{14}$, $R_{15}$) and double convex lens ($R_{16}$, $R_{17}$) functions as a diverging second air lens B with radii $R_{15}$ and $R_{16}$.

The first and second air lenses A and B provide spherical aberrations, astigmatisms and distortions all of which are of the negative sign in third-order aberration coefficient value, and comas of the opposite signs. An example of the numerical data of the third-order aberration coefficient values for spherical aberration I, coma II, astigmatism III and distortion V is given in Table 1 below in connection with the first specific example of the objective of the invention corresponding to FIG. 1 objective.

Table 1

| Air Lens | I | II | III | V |
| --- | --- | --- | --- | --- |
| A ($R_8$, $R_9$) | −1.8531 | 0.4058 | −0.0556 | −0.014 |
| B ($R_{13}$, $R_{14}$) | −2.3974 | −0.6807 | −0.1698 | −0.049 |

As the first and second air lenses A and B are adapted for producing third-order spherical aberrations of the same sign, the otherwise distribution of the diverging power necessary to effect good astigmatic compensation as concentrated at the first air lens A alone will cause production of the fifth-order and the higher order spherical aberrations to greatly increased amounts, though the resulting third-order spherical aberration remains unchanged from that equivalent to the sum of those produced by the first and second air lenses A and B. For facilitating achievement of a greatly increased relative aperture, therefore, it is desirable to distribute the diverging power over two or more air lenses. According to the prior art as applied to the common type of retrofocus wide angle lens objective which is characterized by the lack of a non-spherical surface, the necessary amount of spherical aberration is assured by suitable arrangement of the both surfaces of a negative lens in the third component, thereby it being made possible to increase the relative aperture. Such arrangement of the negative lens results in a decrease in the magnitude of the diverging power of that section which corresponds to the second air lens B.

The objective of the present invention is, however, of the type having a non-spherical surface arranged in the diverging first lens component 1 and is particularly suited for a practical embodiment which is well corrected for distortion even at the fully open aperture with a greatly increased viewing field and which has a larger relative aperture and a more uniform high quality imaging capability than was heretofore possible. To achieve this, because of the insufficient amount of spherical aberration ascribable to the both surfaces of a negative lens in the third component 3, an additional air lens, namely, the first air lens A of the construction specified above is provided to effect good astigmatic compensation over the extended range of the viewing field.

Further, the introduction of the non-spherical surface into the first lens component for the primary purpose of distortional correction can be seen to affect hardly third-order spherical aberration and coma. The spherical aberration acts in a manner similar to that described above. The coma acts as a result of the cancelling of those ascribable to the first and second air lenses A and B, as is understandable from the Table 1, and therefore influences in no undesirable manner the astigmatic compensation.

In the course of development of the objective of the invention with a greatly increased relative aperture, it has proved to be of considerable advantage to construct the diverging first lens component 1 as providing spherical aberration of the negative sign in third-order aberration coefficient value, the converting second lens component 2 as of the negative sign and the third lens component 3 as of the positive sign. In the first specific example of the objective of the invention described hereinafter the result is given in Table 2 below.

Table 2

| Lens Component | Lens Surface No. | Focal Length | I |
| --- | --- | --- | --- |
| 1 | $R_1$ to $R_6$ | −11.0177 | −1.4783 |
| 2 | $R_7$ to $R_{10}$ | 27.3384 | −1.0081 |
| 3 | $R_{11}$ to $R_{17}$ | 13.9767 | 3.6102 |

In order that the first air lens A in component 2 produces spherical aberration, astigmatism and distortion all of which have the third-order aberration coefficient values of the negative sign, it is required to satisfy the following relationship:

$$|Ra| > |Rb|; Rb < 0$$

wherein $Ra$ is the radius of curvature of the surface on the image side of a positive lens in component 2, and $Rb$ is the radius of curvature of the surface on the object side of a negative lens situated just in rear of the aforesaid positive lens.

Furthermore, because of the converging characteristics of second lens component 2, it is preferred from the standpoint either of achieving good aberrational correction, or of minimizing the diameter of the front lens elements to impart a bi-convex form into the overall configuration of second component 2. The number of negative lenses situated in rear of the positive lens ($R_7$, $R_8$) is not limited to only one as in FIG. 1 embodiment, but may be two or more as in FIG. 3 embodiment. If so, the front negative meniscus lens is followed by another negative meniscus lens convex to the rear after an air space functioning as a diverging air lens.

Also, in order that the second air lens in component 3 produces spherical aberration, astigmatism and distortion all of which have the third-order aberration coefficients values of the negative sign, it is required to satisfy the following relationship:

$$|Rc| < |Rd; Rc > 0$$

wherein $Rc$ is the radius of curvature of the surface on the image side of a negative lens in component 3, and $Rd$ is the radius of curvature of the surface on the object side of a positive lens situated just in rear of the aforesaid negative lens.

In addition to the above specific requirements, it is preferred for the purpose of achieving an increased relative aperture by employing a decreased number of lens elements to set forth subsidiary requirements $Ra < 0$ and $Rd > 0$, in other words, the surface $Ra$ be convex toward the rear and the surface $Rd$ be convex toward the front.

The above combination of features of the present invention thus relates to a retrofocus wide angle lens objective having a back focus length longer than the focal length of the complete objective in the form of comprising from front to rear a diverging first lens component having a non-spherical surface, a converging second lens component and a converging third lens component, the second and third components being seprated from each other by a substantial air space in which a diaphragm of the objective is operatively located. The first component may be constructed in a manner known in the art, but a feature which may be considered characteristic of the invention resides in that the first point counting from the front at which the ratio $hv/h_1$ exceeds 1.4 falls in an air space defined between the diverging first component and the converging second component, wherein $h_1$ is the height of a point of a light ray parallel to the optical axis and incident on the first refracting surface of the objective as measured from the optical axis, and $hv$ is the height of incidence on the respective surface identified by the lens number, $v$, as obtained by paraxially tracing the aforesaid light ray through the objective, as can been seen from the following table in which the value $h_1$ is taken as a unit.

Table 3

| Diverging first lens component | | | | | | Converging second lens component | | | |
|---|---|---|---|---|---|---|---|---|---|
| $R_1$ | $R_2$ | $R_3$ | $R_4$ | $R_5$ | $R_6$ | $R_7$ | $R_8$ | $R_9$ | $R_{10}$ |
| 1. | 0.991 | 1.323 | 1.385 | 1.388 | 1.375 | 1.829 | 2.488 | 2.461 | 2.524 |
| Diaphragm | Converging third lens component | | | | | | | | |
| | $R_{11}$ | $R_{12}$ | $R_{13}$ | $R_{14}$ | $R_{15}$ | $R_{16}$ | $R_{17}$ | | |
| | 2.522 | 2.555 | 2.581 | 2.692 | 2.893 | 2.884 | 2.683 | | |

According to the preferred embodiments of the present invention, a retrofocus wide angle lens objective having a focal length $f$, of 5.5 with a back focal length, $bf$, of 14.81 larger than 2.5 times the focal length and a F-number of 1.6 and having an image angle of 101.4° can be constructed from a diverging first lens component consisting of a non-spherical negative meniscus singlet followed by a positive singlet followed by a negative meniscus singlet, a converging second lens component consisting of a bi-convex singlet followed by one or two negative meniscus singlet or singlets of rearward convexity, and a converging third lens component consisting of a negative doublet composed of a positive lens and a negative lens cemented together followed by two positive singlets. The second and third lens components are provided with the respective diverging air lenses formed therein and between which intervenes the diaphragm.

Figure 2:
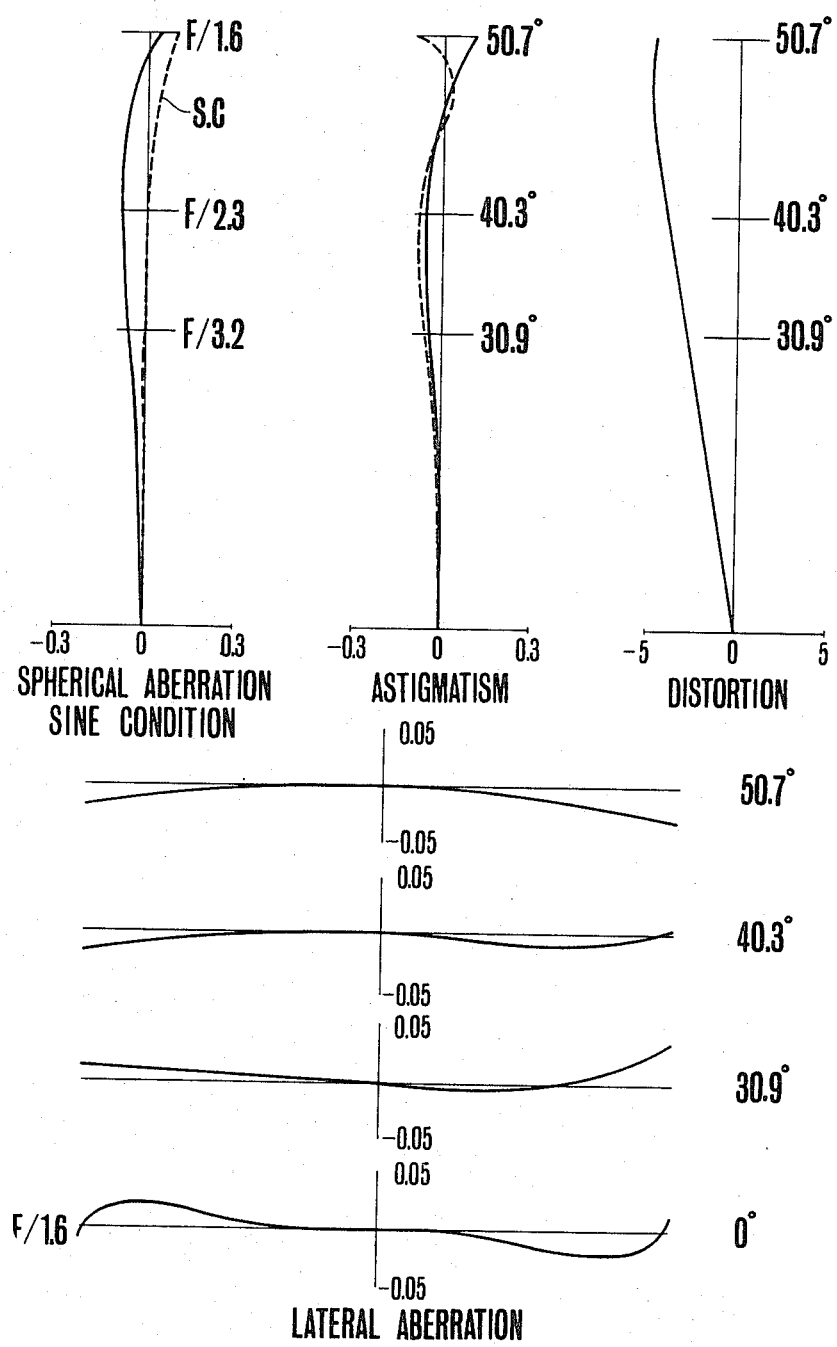
FIG. 2 is a graphic representation of the various aberrations of FIG. 1 objective.
Figure 4:
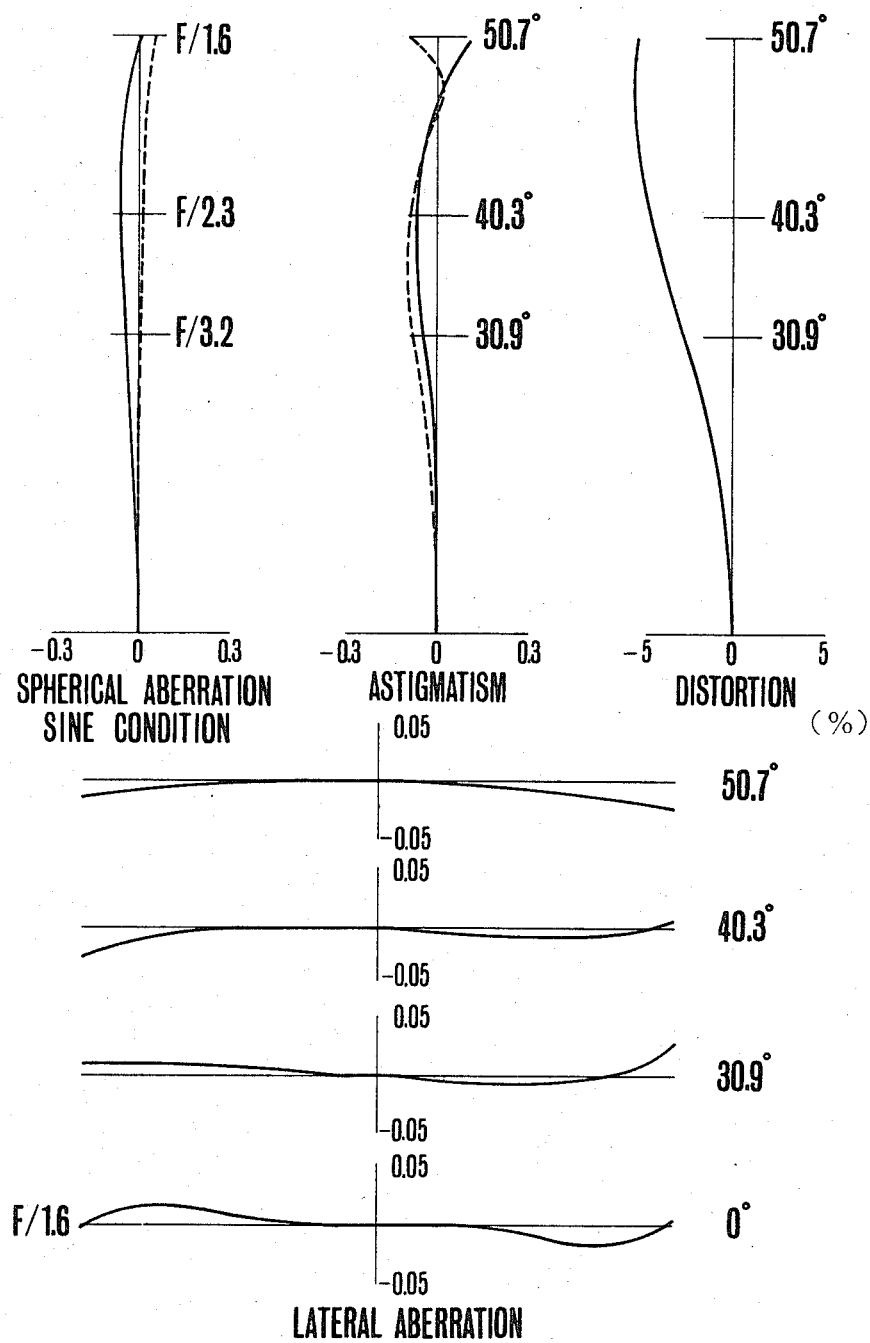
FIG. 4 is a graphic representation of the various aberrations of FIG. 3 lens objective.

In comparison with the objective of FIG. 1, the objective of FIG. 3 is improved with respect to spherical aberration in the outer region of the viewing field as well as in the central image region by employment of an additional negative meniscus singlet ($R_{11}$, $R_{12}$) as is evident from the graphic representations of the various aberrations shown in FIGS. 2 and 4 along with the numerical data given in the specific examples of the embodiments. If the lens performance of FIG. 3 is maintained equivalent to that of FIG. 1, it is possible to provide for FIG. 3 objective a further increased relative aperture.

For the purpose of providing specific examples I and II of a retrofocus wide angle lens objective of the present invention as described and illustrated herein, the following tabulations set forth physical values based, for convenience, upon a focal length, $f$, of 5.5 millimeters (mm) with Tables 4, 5 and 6 corresponding to the lens system shown in FIG. 1 and with Tables 7, 8 and 9 corresponding to the lens system shown in FIG. 3. The various aberrations of the objectives constructed in accordance with the numerical data of Tables 4 and 7 are shown in FIGS. 2 and 4 respectively.

In the following tables, the radii of curvature, R, the axial separations between the successive surfaces, D, the refractive indices of the glass elements, N, and the Abbe numbers, V, are all expressed with the usual subscripts numbered consecutively from front to rear. The plus and minus values of the radii, R, indicates surfaces respectively convex and concave toward the front. The other symbols in the tables have the meaning previously described in the disclosure.

EXAMPLE I

Table 4

| $f = 5.5$mm. | | F-number $= 1.6$ | | $bf = 14.8$mm. | | Image angle $= 101.4°$ | |
|---|---|---|---|---|---|---|---|
| Radii mm. | | Axial Thickness or Separation mm. | | Refractive indices | | Abbe Number | |
| $R_1$ | 91.7136 | $D_1$ | 2.0 | $N_1$ | 1.72 | $V_1$ | 50.2 |
| $R_2$ | 15.1664 | $D_2$ | 8.48 | | | | |
| $R_3$ | 870.701 | $D_3$ | 2.94 | $N_2$ | 1.80518 | $V_2$ | 25.4 |
| $R_4$ | −65.178 | $D_4$ | 0.15 | | | | |
| $R_5$ | 20.854 | $D_5$ | 0.81 | $N_3$ | 1.72 | $V_3$ | 50.2 |
| $R_6$ | 8.4041 | $D_6$ | 5.0 | | | | |
| $R_7$ | 52.795 | $D_7$ | 18.93 | $N_4$ | 1.80518 | $V_4$ | 25.4 |
| $R_8$ | −18.746 | $D_8$ | 0.61 | | | | |
| $R_9$ | −10.4516 | $D_9$ | 1.0 | $N_5$ | 1.62041 | $V_4$ | 60.3 |
| $R_{10}$ | −15.051 | $D_{10}$ | 1.04 | | | | |
| $R_{11}$ | −158.269 | $D_{11}$ | 5.62 | $N_6$ | 1.7725 | $V_6$ | 49.7 |
| $R_{12}$ | −16.2677 | $D_{12}$ | 2.2 | $N_7$ | 1.84666 | $V_7$ | 23.9 |
| $R_{13}$ | 16.3345 | $D_{13}$ | 0.71 | | | | |
| $R_{14}$ | 24.348 | $D_{14}$ | 3.88 | $N_8$ | 1.64 | $V_8$ | 60.2 |
| $R_{15}$ | −13.039 | $D_{15}$ | 0.15 | | | | |
| $R_{16}$ | 19.202 | $D_{16}$ | 2.15 | $N_9$ | 1.6516 | $V_9$ | 58.6 |
| $R_{17}$ | −66.419 | | | | | | |

Table 5

| Aspherical Coefficient | | | | |
|---|---|---|---|---|
| A | B | C | D | E |
| 0 | $3.0846 \times 10^{-5}$ | $-4.9415 \times 10^{-8}$ | $4.0783 \times 10^{-11}$ | $1.6506 \times 10^{-14}$ |

Table 6

| | 3rd-order Aberration Coefficient | | | | |
|---|---|---|---|---|---|
| | I | II | III | P | V |
| $R_1$ | 0.0299 | −0.0718 | 0.1870 | 0.0252 | 0.0804 |
| $R_2$ | −0.0762 | 0.0356 | −0.0167 | −0.1524 | 0.0790 |
| $R_3$ | 0.0102 | 0.0235 | 0.0546 | 0.0028 | 0.1331 |
| $R_4$ | 0. | 0.0001 | −0.0369 | 0.0378 | −0.2972 |
| $R_5$ | 0.0535 | 0.0333 | 0.0208 | 0.1108 | 0.0819 |
| $R_6$ | −1.4957 | 0.4603 | −0.1417 | −0.2750 | 0.1282 |
| $R_7$ | 0.3458 | 0.1122 | 0.0364 | 0.0466 | 0.0269 |
| $R_8$ | 0.8275 | −0.3807 | 0.1751 | 0.1313 | −0.1410 |
| $R_9$ | −2.6806 | 0.7865 | −0.2307 | −0.2022 | 0.1270 |
| $R_{10}$ | 0.4992 | −0.2172 | 0.0945 | 0.1404 | −0.1022 |
| $R_{11}$ | −0.0007 | 0.0029 | −0.0114 | −0.0152 | 0.1063 |
| $R_{12}$ | −0.0975 | 0.0154 | −0.0024 | −0.0077 | 0.0016 |
| $R_{13}$ | −6.3852 | −2.3177 | −0.8413 | −0.1549 | −0.3616 |
| $R_{14}$ | 3.9878 | 1.6370 | 0.6720 | 0.0885 | 0.3122 |
| $R_{15}$ | 3.3507 | −0.0392 | 0.0005 | 0.1652 | −0.0019 |
| $R_{16}$ | −0.0008 | −0.0007 | −0.0006 | 0.1134 | 0.1003 |
| $R_{17}$ | 2.7559 | −0.1603 | 0.0093 | 0.0328 | −0.0025 |
| Σ | 1.1237 | −0.0808 | −0.0315 | 0.0875 | 0.2706 |

EXAMPLE II

Table 7

| f = 5.5 mm. | | F-number = 1.6 | | bf = 14.97 mm. | | Image angle = 101.4° |
|---|---|---|---|---|---|---|
| Radii mm. | | Axial Thickness or Separatio mm. | | Refractive Indices | | Abbe Number |
| $R_1$ | 61.122 | $D_1$ | 2 | $N_1$ | 1.72 | $V_1$ 50.2 |
| $R_2$ | 15.0209 | $D_2$ | 8.48 | | | |
| $R_3$ | 724.102 | $D_3$ | 2.94 | $N_2$ | 1.80518 | $V_2$ 25.4 |
| $R_4$ | −57.173 | $D_4$ | 0.15 | | | |
| $R_5$ | 23.509 | $D_5$ | 0.81 | $N_3$ | 1.72 | $V_3$ 50.2 |
| $R_6$ | 8.0181 | $D_6$ | 5 | | | |
| $R_7$ | 86.903 | $D_7$ | 1.6 | $N_4$ | 1.80518 | $V_4$ 25.4 |
| $R_8$ | −19.292 | $D_8$ | 0.5 | | | |
| $R_9$ | −13.368 | $D_9$ | 1. | $N_5$ | 1.62041 | $V_5$ 60.3 |
| $R_{10}$ | −16.674 | $D_{10}$ | 0.61 | | | |
| $R_{11}$ | −10.9555 | $D_{11}$ | 1 | $N_6$ | 1.62041 | $V_6$ 60.3 |
| $R_{12}$ | −13.595 | $D_{12}$ | 1.04 | | | |
| $R_{13}$ | 72.221 | $D_{13}$ | 5.62 | $N_7$ | 1.7725 | $V_7$ 49.7 |
| $R_{14}$ | −16.881 | $D_{14}$ | 2.2 | $N_8$ | 1.84666 | $V_8$ 23.9 |
| $R_{15}$ | 18.337 | $D_{15}$ | 0.71 | | | |
| $R_{16}$ | 53.719 | $D_{16}$ | 3.88 | $N_9$ | 1.64 | $V_9$ 60.2 |
| $R_{17}$ | −14.766 | $D_{17}$ | 0.15 | | | |
| $R_{18}$ | 19.712 | $D_{18}$ | 2.15 | $N_{10}$ | 1.6516 | $V_{10}$ 58.6 |
| $R_{19}$ | −35.597 | | | | | |

Table 8

| | | Aspherical Coefficient | | |
|---|---|---|---|---|
| A | B | C | D | E |
| 0 | $2.6612 \times 10^{-5}$ | $4.6602 \times 10^{-8}$ | $4.186 \times 10^{-11}$ | $1.4065 \times 10^{-14}$ |

Table 9

| | 3rd-order Aberration Coefficient | | | | |
|---|---|---|---|---|---|
| | I | II | III | P | V |
| $R_1$ | 0.0260 | −0.0622 | 0.1707 | 0.0378 | 0.0501 |
| $R_2$ | −0.0670 | 0.0296 | −0.0131 | −0.1538 | 0.0738 |
| $R_3$ | 0.0075 | 0.0205 | 0.0560 | 0.0034 | 0.1621 |
| $R_4$ | −0.0001 | 0.0013 | −0.0215 | 0.0431 | −0.3686 |
| $R_5$ | 0.0284 | 0.0283 | 0.0283 | 0.0983 | 0.1265 |
| $R_6$ | −1.5503 | 0.4522 | −0.1319 | −0.2882 | 0.1225 |
| $R_7$ | 0.2774 | 0.1227 | 0.0543 | 0.0283 | 0.0365 |
| $R_8$ | 0.5070 | −0.2778 | 0.1522 | 0.1276 | −0.1533 |
| $R_9$ | −1.1169 | 0.4585 | −0.1882 | −0.1581 | 0.1422 |
| $R_{10}$ | 0.4146 | −0.2081 | 0.1044 | 0.1267 | −0.1160 |
| $R_{11}$ | −1.3705 | 0.4561 | −0.1518 | −0.1929 | 0.1147 |
| $R_{12}$ | 0.4519 | −0.1860 | 0.0766 | 0.1555 | −0.0955 |
| $R_{13}$ | 0.0274 | 0.0353 | 0.0456 | 0.0333 | 0.1018 |
| $R_{14}$ | −0.1247 | 0.0183 | −0.0027 | −0.0074 | 0.0015 |
| $R_{15}$ | −3.6158 | −1.4445 | −0.5770 | −0.1380 | −0.2857 |
| $R_{16}$ | 1.1535 | 0.6317 | 0.3460 | 0.0401 | 0.2115 |
| $R_{17}$ | 1.8097 | −0.1150 | 0.0073 | 0.1459 | −0.0097 |
| $R_{18}$ | 0.0705 | 0.0551 | 0.0430 | 0.1105 | 0.1199 |
| $R_{19}$ | 4.0164 | −0.0770 | 0.0015 | 0.0612 | −0.0012 |
| Σ | 0.9450 | −0.0607 | −0.003 | 0.0732 | 0.2331 |

What is claimed is:

1. A retrofocus type wide angle lens comprising, from front to rear in the direction in which light enters said lens from the object, a first lens component of negative refractive power, a second lens component of positive refractive power, a diaphragm, and a third lens component of positive refractive power, said first lens component having at least one non-spherical surface;

said second lens component including a front positive lens group and a rear negative lens group, said front positive lens group including a rearmost double convex lens, said rear negative lens group including a frontmost negative meniscus lens convex to the image, and said rearmost double convex lens and said frontmost negative meniscus lens defining therebetween an air space functioning as a negative air lens; and said third lens component including a front negative lens group and a rear positive lens group, said front group including a rearmost negative lens, said rear group including a frontmost positive lens, and said rearmost negative and said frontmost positive lenses defining therebetween an air space functioning as a negative air lens.

2. A retrofocus type wide angle lens as described in claim 1, wherein said front positive lens group of said second lens component consists of a double convex lens, said rear negative lens group consists of at least one negative meniscus lens convex to the rear, and said rear positive lens group of said third lens component consists of at least two double convex lenses.

3. A retrofocus type wide angle lens as described in claim 2, wherein said rear negative lens group consists of one negative meniscus lens convex to the rear.

4. A retrofocus type wide angle lens as described in claim 2, wherein said rear negative lens group consists of two negative meniscus lenses convex to the rear.

5. A retrofocus type wide angle lens as described in claim 3, wherein said first lens component includes a front negative meniscus lens convex to the front, an intermediate double convex lens, and a rear negative meniscus lens convex to the front.

6. A retrofocus type wide angle lens as described in claim 5, wherein said non-spherical surface is provided in said front negative meniscus lens in said first lens component.

7. A retrofocus type wide angle lens as described in claim 4, wherein said first lens component includes a front negative meniscus lens convex to the front, an intermediate double convex lens, and a rear negative meniscus lens convex to the front.

8. A retrofocus type wide angle lens as described in claim 7, wherein said non-spherical surface is provided in said front negative meniscus lens in said first lens component.

9. A retrofocus type wide angle lens comprising a front negative lens component having at least one non-spherical surface and a rear positive lens component, said rear positive lens component having a diaphragm therein and including from the front facing the object to the rear facing the image:

a first negative lens group arranged on the object side of said diaphragm just in front thereof and having a negative meniscus lens concave to the front, a first positive lens closer to the object from the first negative lens group and having a rear surface convex to the rear and having a front surface whose absolute value of the radius of curvature is smaller than that of the radius of curvature of the rear surface of said first positive lens facing said first negative lens group; and a second negative lens arranged on the image side of said diaphragm and having a rear surface concave to the rear, said second negative lens being followed by a second positive lens having a front surface convex to the front, and said second negative lens having a rear surface whose absolute value of the radius of curvature is smaller than that of the radius of curvature of said front surface of said second positive lens.

10. A retrofocus type wide angle lens as described in claim 9, wherein said front and said rear lens components define therebetween an air space including a boundary at which $h\nu/h_1 = 1.4$ is established, wherein $h_1$ is the length of unit of a point of incidence of a light ray parallel to the optical axis on the first surface of the lens system, measured from the optical axis, and $h\nu$ is the height of incidence on the $\nu$-th surface from the optical axis as obtained by tracing the aforesaid light ray.

11. A retrofocus type wide angle lens as described in claim 10, wherein said first positive lens is a double convex lens, and said second positive lens also is a double convex lens.

12. A retrofocus type wide angle lens as described in claim 11, wherein said first negative lens group consists of one negative meniscus lens concave to the front.

13. A retrofocus type wide angle lens as described in claim 11, wherein said first negative lens group consists of two negative meniscus lenses concave to the front.

14. A retrofocus type wide angle lens as described in claim 12, wherein said front negative lens component includes a front negative meniscus lens convex to the front, an intermediate double convex lens, and a rear negative meniscus lens convex to the front.

15. A retrofocus type wide angle lens as described in claim 14, wherein said non-spherical surface is provided in said front negative meniscus lens in said front lens component.

16. A retrofocus type wide angle lens as described in claim 13, wherein said front negative lens component includes a front negative meniscus lens convex to the front, an intermediate convex lens, and a rear negative meniscus lens convex to the front.

17. A retrofocus type wide angle lens as described in claim 16, wherein said non-spherical surface is provided in said front negative meniscus lens convex to the front.

* * * * *